United States Patent
Riou et al.

(10) Patent No.: US 9,726,562 B2
(45) Date of Patent: Aug. 8, 2017

(54) PRESSURE SENSOR MADE FROM NANOGAUGES COUPLED TO A RESONATOR

(71) Applicant: SAGEM DEFENSE SECURITE, Boulogne Billancourt (FR)

(72) Inventors: Jean-Christophe Riou, Boulogne Billancourt (FR); Guillaume Lehee, Boulogne Billancourt (FR)

(73) Assignee: SAGEM DEFENSE SECURITE, Boulogne Billancourt (FR)

( * ) Notice: Subject to any disclaimer, the term of this patent is extended or adjusted under 35 U.S.C. 154(b) by 113 days.

(21) Appl. No.: 14/431,507

(22) PCT Filed: Sep. 26, 2013

(86) PCT No.: PCT/EP2013/070084
§ 371 (c)(1),
(2) Date: Mar. 26, 2015

(87) PCT Pub. No.: WO2014/049062
PCT Pub. Date: Apr. 3, 2014

(65) Prior Publication Data
US 2015/0241291 A1 Aug. 27, 2015

(30) Foreign Application Priority Data
Sep. 26, 2012 (FR) ...................... 12 59067

(51) Int. Cl.
*G01L 11/00* (2006.01)
*G01L 9/00* (2006.01)
(Continued)

(52) U.S. Cl.
CPC ............ *G01L 9/0052* (2013.01); *G01L 9/006* (2013.01); *G01L 9/0019* (2013.01); *G01L 13/025* (2013.01); *G01L 19/04* (2013.01)

(58) Field of Classification Search
None
See application file for complete search history.

(56) References Cited

U.S. PATENT DOCUMENTS 5,275,055 A * 1/1994 Zook ................. G01P 15/097
310/309
2007/0074578 A1 4/2007 Subramanian
(Continued)

FOREIGN PATENT DOCUMENTS

EP  1 273 896 A2  1/2003
EP  2 008 965 A2  12/2008

OTHER PUBLICATIONS

Welham et al., "A high accuracy resonant pressure sensor by fusion bonding and trench etching," *Sensors and Actuators*, vol. 76, No. 1-3, Aug. 31, 1999, pp. 298-304.
(Continued)

*Primary Examiner* — Andre Allen
(74) *Attorney, Agent, or Firm* — Muncy, Geissler, Olds & Lowe, P.C.

(57) ABSTRACT

A pressure sensor made of semiconductor material, the sensor comprising a box defining a housing under a secondary vacuum, at least one resonator received in the housing and suspended by flexible beams from at least one elastically deformable diaphragm closing the housing that also contains means for exciting the resonator in order to set the resonator into vibration and detector means for detecting a vibration frequency of the resonator. The detector means comprise at least a first suspended piezoresistive strain gauge having one end secured to one of the beams and one end secured to the diaphragm. The resonator and the first strain gauge are arranged to form zones of doping that are substantially identical in kind and in concentration.

23 Claims, 3 Drawing Sheets

(51) Int. Cl.
*G01L 13/02* (2006.01)
*G01L 19/04* (2006.01)

(56) References Cited

U.S. PATENT DOCUMENTS

| | | | | |
|---|---|---|---|---|
| 2011/0219875 A1* | 9/2011 | Walther | ................ | B81B 3/0051 73/514.29 |
| 2013/0000411 A1* | 1/2013 | Robert | .................. | G01L 9/0052 73/708 |

OTHER PUBLICATIONS

Welham et al., "A Laterally Driven Micromachined Resonant Pressure Sensor," The 8$^{th}$ International Conference on Solid-State Sensors and Actuators, and Eurosensors IX, Stockholm, Sweden, Jun. 25-29, 1995, pp. 586-589.

* cited by examiner

PRESSURE SENSOR MADE FROM NANOGAUGES COUPLED TO A RESONATOR

BACKGROUND OF THE INVENTION

The present invention relates to a fluid pressure sensor, e.g. usable for a vehicle wheel in order to detect the inflation pressure of a pneumatic tire on the wheel.

In applications that require sensors of small size, it is known to have recourse to sensors made by etching plates of crystal material. One such pressure sensor, said to be of the resonant type and recognized as having performance that is better than ordinary micro-machined sensors comprising a diaphragm with strain gauges, comprises a box defining a housing, and at least one resonator received in the housing and suspended by flexible beams from at least one elastically deformable diaphragm closing the housing. The housing also contains resonator excitation means for setting the resonator into vibration and detector means for detecting a vibration frequency of the resonator. The deformable diaphragm thus interacts with the resonator in such a manner that deformation of the diaphragm under pressure from the surrounding fluid leads to a corresponding variation in the frequency of the resonator. The excitation means are arranged to set the resonator into vibration at its resonant frequency and the detector means are constituted for example by capacitive elements or by strain gauges that provide a control unit with a signal representative of the vibration frequency of the resonator. The control unit is arranged to deduce the pressure acting on the diaphragm from the frequency it detects.

It is found that many of those sensors present low sensitivity.

Capacitive detection is complex to develop and is thus less effective than strain gauge detection, at least in theory. In practice, strain gauge detection is found to be of relatively low performance.

In order to improve the sensitivity of sensors, the circuit of the control unit has been made more complex in order to process the signals delivered by the strain gauges. That has contributed to increasing the cost and the general size of the sensor but without that leading to a sufficient increase in sensitivity.

BRIEF SUMMARY OF THE INVENTION

An object of the invention is to remedy that lack of sensitivity, at least in part.

In pressure sensors having a diaphragm, a resonator, and a strain gauge, the crystal material is a semiconductor material on which the strain gauge is made by doping the surface of the semiconductor material. Unfortunately, it has been found that undesirable migration of dopants occurs in the vicinity of the strain gauge and over its entire length, thereby reducing the sensitivity of said strain gauge. Measurement becomes highly temperature-sensitive and tends to drift with time.

According to the invention, there is provided a pressure sensor made of semiconductor material, the sensor comprising a box defining a housing under a secondary vacuum, at least one resonator received in the housing and suspended by flexible beams from at least one elastically deformable diaphragm closing the housing that also contains means for exciting the resonator in order to set the resonator into vibration and detector means for detecting a vibration frequency of the resonator. The detector means comprise at least a first suspended piezoresistive strain gauge having one end secured to one of the beams and one end secured to the diaphragm. The resonator and the first strain gauge are arranged to form zones of doping that are substantially identical in kind and in concentration.

Thus, the strain gauge is in contact with the remainder of the material constituting the sensor only via its ends. The flow section available for dopants is thus extremely small, which limits the possibility of dopants migrating. The same applies to the uniformity of the dopants in terms of kind (boron, phosphorous, arsenic, . . . ) and of concentration. In addition, suspending the strain gauge from the diaphragm makes it possible to maintain the resonator and the strain gauge substantially on a common level line as they move out of the plane in response to pressure, thus making it easier to process the signals delivered by the strain gauge.

Advantageously, the strain gauge is immersed in a vacuum, preferably a secondary vacuum, so as to improve the stability and the performance of measurement (Q factor, gauge factor, . . . ). Interactions between the strain gauge and any gas molecules contained in the housing are limited, thereby avoiding charge trapping, viscous friction, etc.

Advantageously, the strain gauge has a cross-section that is rectangular with a long side that is less than 1 micrometer ($\mu$m) long and preferably about 250 nanometers (nm) long.

The section available for dopant migration is thus extremely small. In addition, this makes greater latitude possible in positioning the strain gauge.

Under such circumstances, and advantageously, the strain gauge has a length of less than 10 $\mu$m, and that is preferably equal to about 3 $\mu$m.

The strain gauge is then particularly compact, thereby enabling the overall size of the sensor to be reduced.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
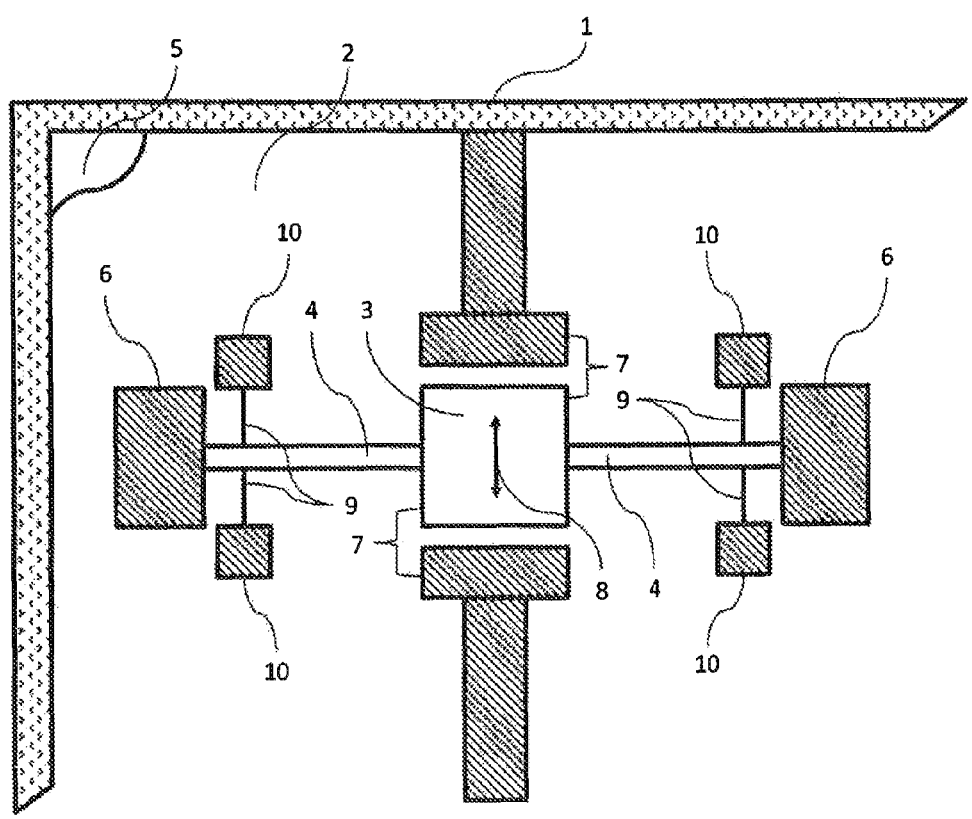
FIG. 1 is a fragmentary diagrammatic plan view of a sensor in a first embodiment of the invention.

With reference to FIG. 1, the pressure sensor in the first embodiment of the invention comprises a box 1, substantially in the form of a rectangular parallelepiped in this example, defining a housing 2 under a secondary vacuum (in this embodiment, the pressure is no greater than $10^{-5}$ atmospheres).

A resonator 3 in the form of a single flyweight is received in the housing 2 and is suspended by flexible beams given overall reference 4 from an elastically deformable diaphragm 5 that closes the housing 2 (the diaphragm 5 closes the top opening of the housing 2 and lies in a plane parallel to the sheet of FIG. 1).

The resonator 3 is substantially in the form of a rectangular block, as shown in FIG. 1. The length of the seismic size of the resonator 3 lies substantially in the range 20% to 40% of the total length of the resonator 3, and is preferably 25%. The resonator 3 is not in direct contact with the diaphragm 5.

The beams 4 form two suspension arms for the resonator 3 that are positioned on either side of it and that are connected to two studs 6 secured to the diaphragm. The beams 4 may be duplicated as pairs of parallel beams. The studs 6 are made integrally with the fine portion of the diaphragm 5 and they project therefrom. The studs 6 are positioned in such a manner that deformation of the diaphragm 5 causes the studs 6 to move longitudinally, which movement is transmitted to the beams 4.

The housing 2 also contains means for exciting the resonator 3, which means are arranged to set the resonator 3 into vibration. In this example, the excitation means comprise transducer-forming facing electrode pairs 7 that, on being subjected to a voltage, generate a driving force on the resonator 3 causing the resonator 3 to perform reciprocating motion in a direction 8 parallel to the diaphragm 5 and perpendicular to the beams 4.

The sensor has detector means for detecting a vibration frequency of the resonator 3. The detector means comprise strain gauges 9 operating differentially, which strain gauges extend perpendicularly to the beams 4, with each of them being suspended so that one of its ends is secured to one of the beams 4 and its other end is secured to the diaphragm 5, and more particularly to a stud 10 of the diaphragm 5. The studs 10 are made integrally with the fine portion of the diaphragm 5 and they project therefrom. The studs 10 are positioned in such a manner that deformation of the diaphragm 5 causes the studs 10 to move in a way that is not transmitted to the strain gauges 9.

The strain gauges 9 are arranged so as to form differential pairs operating in phase opposition and alternating between tension and compression. The detector means are arranged in such a manner that the strain gauges 9 vibrate in a differential tension-compression mode outside their range of resonance, by forming a Wheatstone bridge. This makes it possible to decorrelate the contribution to the signal of temperature and the contribution to the signal of pressure, since temperature only is present in common mode whereas both temperature and pressure are present in dynamic differential mode.

In the invention, the strain gauges are arranged to enable resistances to be measured that are representative of a frequency of the resonator as contrasted with measuring capacitances representative of an amplitude of diaphragm deformation, as has been done in certain prior art sensors.

The studs 10 are in the vicinity of the studs 6, and the strain gauges 9 are connected to the beams 4 in the vicinity of the connections between the beams 4 and the studs 6, so that the strain gauges 9 are anchored to the beams 4 in a zone lying in the range 5% to 15% (and advantageously in the range 8% to 9%) of the length of the beams 4.

Each strain gauge 9 has a cross-section that is rectangular with the long side of the rectangle being less than 1 µm in length and advantageously being equal to 250 nm in this example, and with the short side being of a length that may be as much as one order of magnitude smaller.

Each strain gauge 9 has a length of less than 10 µm, and in this example advantageously of about 3 µm.

The sensor, and more precisely the resonator 3, the diaphragm 5, the beams 4, the studs 6, 10, and the strain gauges 9 are made by etching a sheet of crystal material, e.g. such as silicon alloyed with nitrogen or carbon, or polycrystalline silicon or "polysilicon", or a liquid crystal polymer.

The resonator and the strain gauges are arranged to form zones of doping that are substantially identical in kind and in concentration.

The arrangement of the sensor of the invention makes it possible to fabricate sensors having different pressure ranges on the same wafer of crystal material, e.g. preferably by acting on the dimensions of the diaphragms and of the resonators.

Elements that are identical or analogous to those described above are given the same numerical references in the description below of the second and third embodiments.

Figure 2:
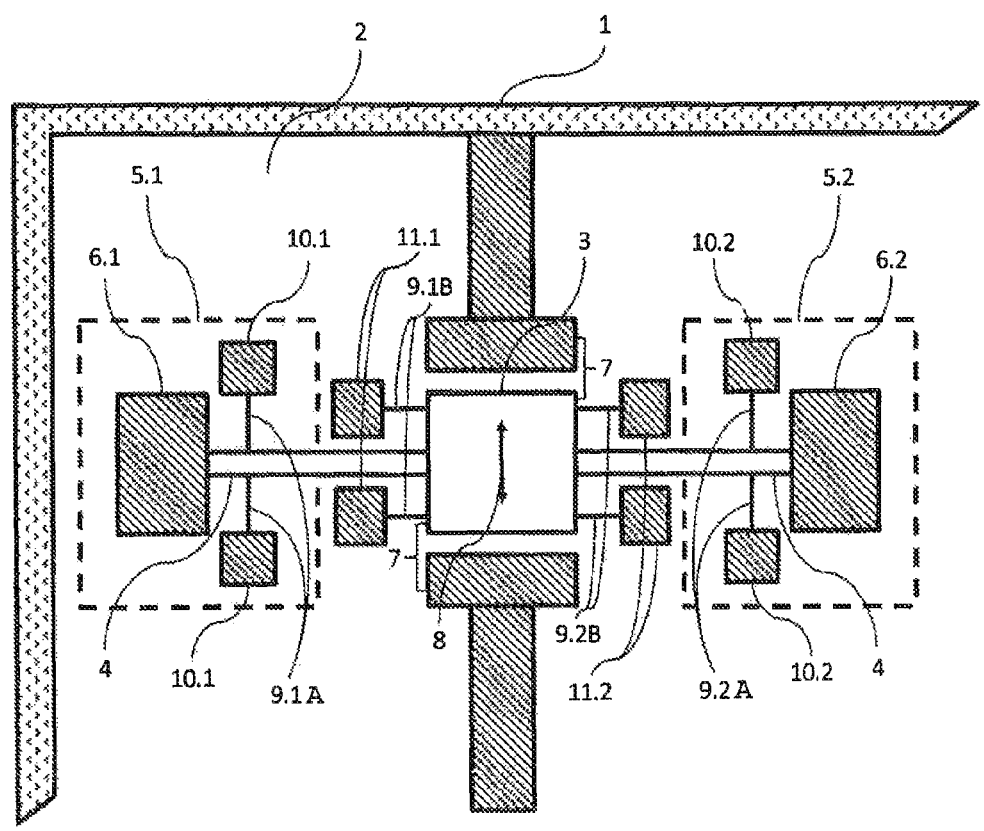
FIG. 2 is a fragmentary diagrammatic plan view of a sensor in a second embodiment of the invention.

With reference to FIG. 2, which shows the second embodiment, the box 1 is in the form of a frame on which there extend both a diaphragm 5.1 and a diaphragm 5.2, which diaphragms are coplanar.

This defines a cavity in which there is located a resonator 3 that is suspended from the diaphragm 5.1 and from the diaphragm 5.2 by beams 4. Two beams 4 have one end secured to the resonator 3 and an opposite end secured to a respective stud 6.1, 6.2.

The sensor has first strain gauges 9.1A, 9.2A that are identical to the strain gauges 9 of the first embodiment, each having one end secured to a stud 10.1, 10.2 secured to the respective diaphragm 5.1, 5.2 and an opposite end secured to one of the beams 4 in such a manner that the first strain gauges 9.1A, 9.2A perpendicular to the beams 4 and parallel to the diaphragms 5.1, 5.2 form differential pairs. One of the strain gauges 9.1A is in tension while the other strain gauge 9.1A is in compression, and vice versa. The same applies to the strain gauges 9.2A. The first strain gauges 9.1A, 9.2A operate like the strain gauges 9 in the first embodiment. Each of the studs 6 is positioned in a zone lying in the range 20% to 60% of half of the dimension of the diaphragm of the sensor, preferably along its short axis, going from the center of the diaphragm 5.1, 5.2 (and preferably 35%).

The sensor has two second strain gauges 9.1B and two second strain gauges 9.2B, each having one end secured to a respective stud 11.1, 11.2 close respectively to the diaphragms 5.1, 5.2 but not secured thereto, and an opposite end secured to the resonator 3 in such a manner that the second strain gauges 9.1B, 9.2B parallel to the beams 4 and parallel to the diaphragms 5.1, 5.2 operate in phase opposition. The two strain gauges 9.1B are in tension while the two strain gauges 9.2B are in compression, and vice versa.

In use, the diaphragms 5.1, 5.2 are for being subjected to respective pressures P1 and P2.

The first strain gauges 9.1A and 9.2A serve to measure a signal that is proportional to (P1+P2)/2.

The second strain gauges 9.1B and 9.2B serve to measure a signal proportional to $\Delta P = P1 - P2$. Thus, if P1>P2, the strain gauges 9.1B are generally in compression and the strain gauges 9.2B are generally in elongation, and vice versa if P1<P2.

Figure 3:
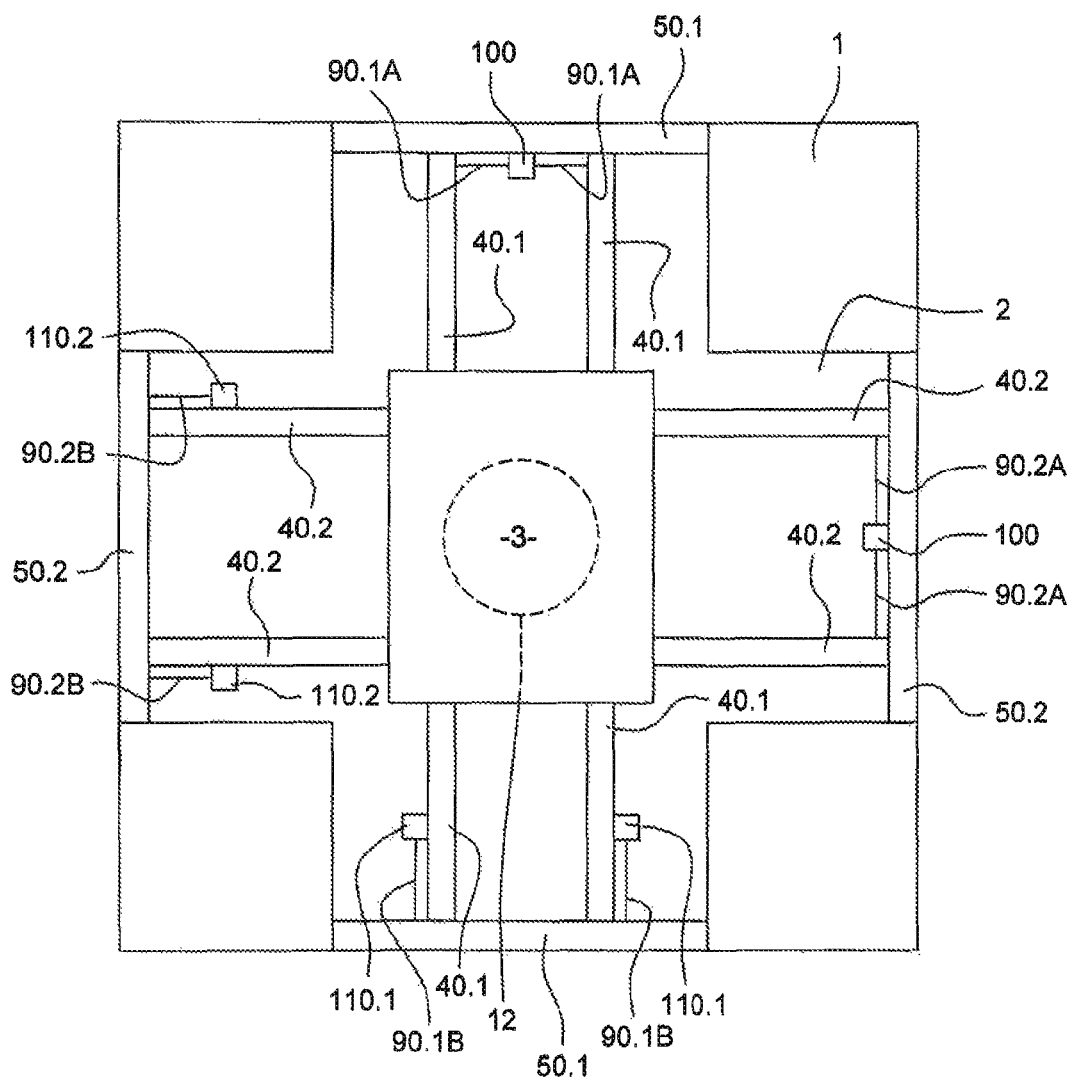
FIG. 3 is a diagrammatic plan view of a sensor in a third embodiment.

With reference to FIG. 3, and in the third embodiment, the box 1 is in the form of a rectangular parallelepiped with four lateral openings giving access to the housing 2 (one opening in each of the sides of the box 1). These openings are closed by diaphragms so as to form a first pair of diaphragms 50.1 and a second pair of diaphragms 50.2, each pair of diaphragms closing the openings of two opposite sides of the box 1 and thus forming a cavity that is subjected to a secondary vacuum. The box 1 is arranged in such a manner that the first pair of diaphragms 50.1 and the second pair of diaphragms 50.2 are subjected to different pressures (differential pressure measurement). For this purpose, the box 1 has at least a first opening (not shown) giving access to the diaphragms 50.1 of the first pair of diaphragms 50.1, and at least one second opening (not shown) giving access to the diaphragms 50.2 of the second pair of diaphragms 50.2, said openings leading for example to opposite surfaces of the box 1. In this way, the sensor can be positioned so that the diaphragms 50.1 are subjected to the fluid of pressure that is to be measured, while the diaphragms 50.2 are subjected to another pressure, either a pressure that is to be measured or else a reference pressure.

The beams 40 are arranged as two first pairs of beams 40.1 that are parallel to each other and two second pairs of beams 40.2 that are parallel to each other connecting four sides of the resonator 3 that are opposite in pairs to the pairs of diaphragms 50.1, 50.2. The beams 40.1 connected to the diaphragms 50.1 are perpendicular to said diaphragms 50.1, and the beams 40.2 connected to the diaphragms 50.2 are perpendicular to said diaphragms 50.2. The beams 40.1, 40.2 are connected directly to the fine portions of the diaphragms 50.1, 50.2. The first pairs of beams 40.1 are substantially perpendicular to the second pairs of beams 40.2.

The sensor has eight strain gauges 90.1A, 90.1B, 90.2A, 90.2B, each connected to one of the beams 40.1, 40.2 vibrating in a differential tension-compression mode outside their range of resonance and forming at least one Wheatstone bridge.

The strain gauges 90.1A connected to the beams 40.1 of one of the first pairs of beams 40.1 extend perpendicular to the beams 40.1, and the strain gauges 90.1B connected to the beams 40.1 of the other one of the first pairs of beams 40.1 extend parallel to the beams 40.1. The strain gauges 90.2A connected to the beams 40.2 of one of the second pairs of beams 40.2 extend perpendicularly to the beams 40.2 and the strain gauges 90.2B connected to the beams 40.2 of the other of the second pairs of beams 40.2 extend parallel to the beams 40.2.

Each strain gauge 90.1A, 90.2A is suspended, having one end connected to one of the beams 40.1, 40.2 and its other end connected to a stud 100 of the corresponding diaphragm 50.1, 50.2. Each strain gauge 90.1B, 90.2B is suspended, having one of its ends connected to a stud 110.1, 110.2 secured to one of the beams 40.1, 40.2, and its other end connected directly to the fine portion of the corresponding diaphragm 50.1, 50.2. The studs 110.1, 110.2 are made integrally with the beams 40.1, 40.2 and they project therefrom. The studs 110.1, 110.2 are positioned in such a manner that deformation of the beams 40.1, 40.2 causes the studs 110.1, 110.2 to move in a manner that is transmitted to the strain gauges 90.

The strain gauges 90.1A, 90.2A are used for measuring pressure itself, while the strain gauges 90.1B, 90.2B are used for evaluating the influence of temperature on the behavior of the beams 40.1, 40.2. It can be understood that the strain gauges 90.1B and 90.2B essentially measure the thermal expansion of the beams 40.1, 40.2. The signals delivered by the strain gauges 90.1, 90.2, A and B are processed by a control unit (not shown and itself known) that is connected to the sensor.

The strain gauges 90 have the same dimensions as in the first embodiment.

The excitation means are arranged to cause the resonator 3 to reciprocate between two positions in a direction normal to the plane of the sheet of FIG. 3. The excitation means comprise at least one element, in this example an electrode 12, for moving the resonator 3 from a first position towards a second position and an element for resiliently returning the resonator towards its first position. The resilient return element in this example is constituted by the beams 40.1, 40.2.

Naturally, the invention is not limited to the embodiments described but covers any variant coming within the ambit of the invention as defined by the claims.

In particular, the sensor may have a plurality of resonators, e.g. two resonators. Nevertheless, it is difficult to have two flyweights with exactly the same resonant frequency, so one of them will not be operating with its maximum Q factor (ratio of resonant frequency over expected frequency variation), thereby leading to inaccuracy that increases with increasing temperature.

The pairs of beams may be replaced by single beams.

The sensor may be made from one or more sheets of crystal material by etching, adhesive bonding, and/or welding.

The diaphragm may have a shape with an outline that is polygonal, for example rectangular or square, or with an outline that is curved, for example elliptical or circular. If it has an elongate shape with a major axis and a minor axis, it is preferable for the ratio of minor axis over major axis to lie substantially in the range 1 to ½, and preferably for it to be substantially equal to 1/1.3.

The excitation means may comprise electrodes that are plane or electrodes of some other shape, e.g. in the form of combs.

In a variant, the studs 10 may be made integrally with the studs 6.

In another variant, the studs 10 are in the vicinity of the resonator 3 and the strain gauges 9 are connected to the beams 4 in the vicinity of the connections between the beams 4 and the resonator 3.

The invention claimed is:

1. A pressure sensor made of semiconductor material, the sensor comprising a box defining a housing under a secondary vacuum, at least one resonator received in the housing and suspended by flexible beams from at least one elastically deformable diaphragm closing the housing that also contains means for exciting the resonator in order to set the resonator into vibration and detector means for detecting a vibration frequency of the resonator, the detector means comprising at least a first piezoresistive strain gauge, the sensor being characterized in that the first strain gauge is suspended, having one end secured to one of the beams and one end secured to the diaphragm, and in that the resonator and the first strain gauge are arranged to form zones of doping that are substantially identical in kind and in concentration.

2. The sensor according to claim 1, having a single resonator.

3. The sensor according to claim 2, having two beams connecting two opposite sides of the resonator to the diaphragm and the sensor has two first strain gauges, each connected to one of the beams.

4. The sensor according to claim 3, wherein the first strain gauges extend perpendicular to the beams.

5. The sensor according to claim 3, including at least one second suspended strain gauge having one end secured to the resonator and an end secured to the diaphragm, the resonator and the strain gauges being arranged to form zones of doping that are substantially identical in kind and in concentration.

6. The sensor according to claim 5, wherein the second strain gauge is parallel to one of the beams.

7. The sensor according to claim 5, having two second strain gauges.

8. The sensor according to claim 5, wherein the first strain gauge connected to one of the beams extends perpendicularly to said beam and the second strain gauge connected to the other beam extends parallel to that other beam.

9. The sensor according to claim 2, wherein the beams are organized as two parallel first beams and two parallel second beams respectively connecting four sides of the resonator that are opposite in pairs to the diaphragms, and the sensor has four pairs of strain gauges, each connected to one of the beams, the first beams being perpendicular to the second beams.

10. The sensor according to claim 9, wherein the strain gauge connected to one of the first beams extends perpendicularly to the first beams and the strain gauge connected to the other of the first beams extends perpendicularly to the first beams, and the strain gauges connected to the second beams are arranged in the same manner as the strain gauges connected to the first beams.

11. The sensor according to claim 9, wherein the box carries a first pair of diaphragms perpendicular to the first beams and each connected to one of the first beams and to the corresponding strain gauges, and a second pair of diaphragms perpendicular to the second beams and each connected to one of the second beams and to the corresponding strain gauges, the box being arranged in such a manner that the first pair of diaphragms and the second pair of diaphragms are subjected to different pressures.

12. The sensor according to claim 11, wherein the box has at least one first access opening to the diaphragms of the first pair of diaphragms and at least one second access opening to the diaphragms of the second pair of diaphragms, the openings opening out to surfaces on the same side of the box.

13. The sensor according to claim 1, wherein each beam is duplicated in order to form a pair of beams.

14. The sensor according to claim 1, wherein the beams and the strain gauge extend parallel to the diaphragm and have one end connected to a stud projecting from a fine portion of the diaphragm.

15. The sensor according to claim 1, wherein the beams extend perpendicularly to the diaphragm.

16. The sensor according to claim 1, wherein the strain gauge has a cross-section that is rectangular with a long side of length less than 1 µm.

17. The sensor according to claim 16, wherein the strain gauge has a cross-section that is rectangular with a long side of length equal to about 250 nm.

18. The sensor according to claim 16, wherein the strain gauge has a length less than 10 µm.

19. The sensor according to claim 18, wherein the strain gauge has a length of about 3 µm.

20. The sensor according to claim 1, wherein the means for exciting the resonator are arranged to move the resonator to reciprocate between two positions.

21. The sensor according to claim 1, wherein the excitation means for exciting the resonator comprise at least one element for moving the resonator from a first position to a second position, and an element for resiliently returning the resonator towards its first position.

22. A pressure sensor made of semiconductor material, the sensor comprising a box defining a housing under a secondary vacuum, at least one resonator received in the housing and suspended by flexible beams from at least one elastically deformable diaphragm closing the housing that also contains means for exciting the resonator in order to set the resonator into vibration and detector means for detecting a vibration frequency of the resonator, the detector means comprising at least a first piezoresistive strain gauge, the sensor being characterized in that the first strain gauge is suspended, having one end secured to one of the beams and one end secured to the diaphragm, and in that the resonator and the first strain gauge are arranged to form zones of doping identical in kind and in concentration.

23. A pressure sensor made of semiconductor material, the sensor comprising a box defining a housing under a pressure no greater than $10^{-5}$ atmospheres, at least one resonator received in the housing and suspended by flexible beams from at least one elastically deformable diaphragm closing the housing that also contains means for exciting the resonator in order to set the resonator into vibration and detector means for detecting a vibration frequency of the resonator, the detector means comprising at least a first piezoresistive strain gauge, the sensor being characterized in that the first strain gauge is suspended, having one end secured to one of the beams and one end secured to the diaphragm, and in that the resonator and the first strain gauge are arranged to form zones of doping identical in kind and in concentration.

* * * * *